US009420434B2

(12) United States Patent
Root (10) Patent No.: US 9,420,434 B2
(45) Date of Patent: Aug. 16, 2016

(54) GENERATING A WARNING MESSAGE IF A PORTABLE PART ASSOCIATED WITH A WIRELESS AUDIO CONFERENCING SYSTEM IS NOT CHARGING

(71) Applicant: REVOLABS, INC., Sudbury, MA (US)

(72) Inventor: Timothy Root, Nashua, NH (US)

(73) Assignee: Revo Labs, Inc., Sudbury, MA (US)

( * ) Notice: Subject to any disclaimer, the term of this patent is extended or adjusted under 35 U.S.C. 154(b) by 438 days.

(21) Appl. No.: 13/889,071

(22) Filed: May 7, 2013

(65) Prior Publication Data

US 2014/0335838 A1 Nov. 13, 2014

(51) Int. Cl.
*H04M 3/42* (2006.01)
*H04W 4/06* (2009.01)
*H04M 3/56* (2006.01)
*H04L 12/18* (2006.01)

(52) U.S. Cl.
CPC .............. *H04W 4/06* (2013.01); *H04L 12/1827* (2013.01); *H04M 3/56* (2013.01)

(58) Field of Classification Search
CPC ....... H04M 3/56; H04W 12/06; H04W 12/12; H04W 8/245; H04W 88/02; Y02E 60/12; B62D 57/032; G06N 3/008; B25J 9/0003; Y10S 901/01; Y10S 901/49
USPC .......... 455/416, 411, 410, 418, 421; 320/107; 700/245; 901/1; 340/636.1
See application file for complete search history.

(56) References Cited

U.S. PATENT DOCUMENTS

| | | | |
|---|---|---|---|
| 2007/0149246 A1* | 6/2007 | Bodley | H04R 3/005 455/556.1 |
| 2011/0234153 A1* | 9/2011 | Abramson | A01D 34/008 320/107 |
| 2012/0010774 A1* | 1/2012 | McQuade | G08G 1/20 701/29.6 |
| 2012/0306655 A1* | 12/2012 | Tan | G01R 31/3651 340/636.1 |

FOREIGN PATENT DOCUMENTS

GB 2386297 A * 10/2003 ............ H04W 24/00

* cited by examiner

*Primary Examiner* — Charles Appiah
*Assistant Examiner* — Alexander Yi
(74) *Attorney, Agent, or Firm* — Robert Schuler (57) ABSTRACT

A wireless audio conferencing system has one base station and a number of portable parts each of which is able to establish a communication link with the base station. The base station is controlled to initiate and to terminate communication sessions with other communication devices over a communications network such as a LAN or a WAN, and the base station includes a DSP the implements a digital radio and system application functionality that monitors and stores certain operational state characteristics associated with the portable parts. The base station uses the stored operational state characteristics associated with each portable part to determine whether, at the end of a communication session, a portable part is connected to a charging tray or not, and if not, the base station operates to transmit a warning message indicating that a portable part is not being charged.

17 Claims, 8 Drawing Sheets

FIXED & PORTABLE OPERATIONAL STATE CHARACTERISTIC DETECTION (Application) 331

FIG. 6

WIRELESS MICROPHONE

FIG. 9

GENERATING A WARNING MESSAGE IF A PORTABLE PART ASSOCIATED WITH A WIRELESS AUDIO CONFERENCING SYSTEM IS NOT CHARGING

1. FIELD OF THE INVENTION

The present disclosure relates generally to wireless audio conferencing systems having a charging tray to which portable devices can be placed for charging.

2. BACKGROUND

Meetings held in large rooms involving two or more individuals can be facilitated using an audio conferencing system. Audio conferencing systems typically include some number of microphones, at least one loudspeaker and a base station which may or may not be linked to a network. The microphones can operate to pick up local acoustic audio signals (speech) and transmit the signals to the base station which generally operates to provide session control and to process the audio signals in a number of ways before sending the signals to a far end system to be played. Among other things, the base station can be configured to track the operational state characteristics of each of the portable devices. Recently, some audio conferencing systems have been designed with wireless or portable microphones, speakers and control devices. Such wireless audio conferencing systems afford much greater flexibility with respect to the conduct of a meeting, permitting individuals to participate in a meeting while moving around the conference room and permitting the optimal placement of the speaker so that it can be heard by everyone in the room.

Figure 1:
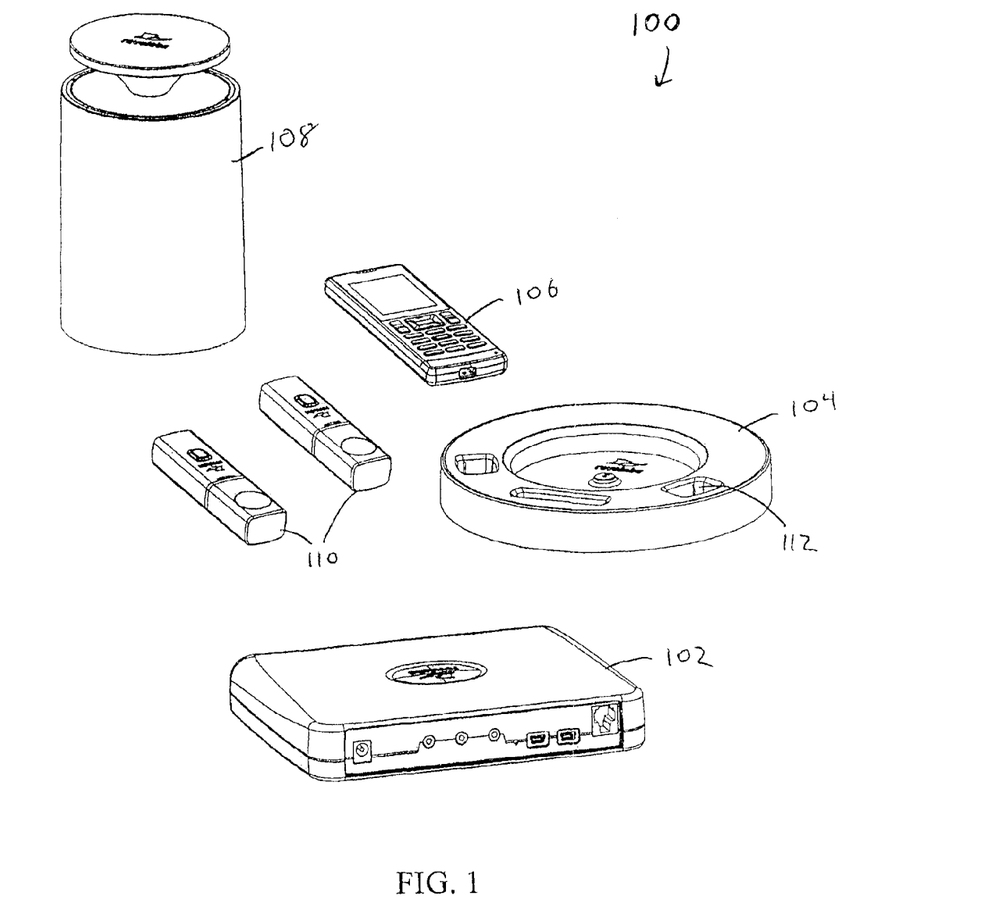
FIG. 1 is a diagram showing the functional components comprising a wireless audio conferencing system 100 not positioned in a charging tray.

FIG. 1 is a diagram showing functional components comprising a commercially available room audio system 100. The system 100 can be comprised of a fixed base station 102 and several different types of wireless or portable devices. In this case, the system 100 has a number of wireless microphones 110, one or more loudspeakers 108, a wireless control device 106, and a charging tray 104. The charging tray 104 has a charging receptacle for each of the portable devices such that when a portable device is placed in the tray an electrical potential will be applied to the portable device and it's battery will start charging.

3. BRIEF DESCRIPTION OF THE DRAWINGS

The present invention can be best understood by reading the specification with reference to the following figures, in which.

4. DETAILED DESCRIPTION

An audio conferencing system operating to support portable microphones and speakers is convenient for the conduct of an audio conference session in a large meeting room, however, if each of the portable devices associated with the audio conferencing system is not returned to the charging tray at the end of a communication session (call), the battery in the device will not be recharged, and it is possible that the device will stop operating during a subsequent communication session due to a low battery condition.

Depending upon the number of portable devices supported by an audio conferencing system and used during a session, ensuring that all of the portable devices (especially microphones) are replaced in a charging tray may not be an easy task. While some participants in an audio conferencing session who use a portable microphone may remember to replace the microphone in the charging tray, others may not remember and simply lay their microphone down on a meeting table without turning it off, and others may walk out of the meeting room with the microphone. The larger the number of portable microphones that are supported by the conferencing system, the greater is the chance that one or more of the microphones will not be replaced in the charging tray at the end of a session. As a consequence, at the beginning of a next conferencing session, a session participant may attempt to use a portable device whose battery is not fully charged or almost completely discharged, and have to disrupt the session looking for another portable device, even if one is available. Still worse, if the portable device is a wireless loudspeaker, and the loudspeaker is not replaced in a charging tray to be recharged, the audio conferencing system may not be able to play a far end audio signal at the point in time that the speaker battery drops below a certain threshold level.

In light of the problems associated a portable device not being returned to a charging tray at the conclusion of an audio conferencing session, and in light of the disruption to an audio conferencing session caused by a low battery condition in a portable device, it would be advantageous if an audio conferencing system is able to determine that a portable device is not returned to a charging tray at the conclusion of an audio conferencing session, and if a portable device is not returned, to warn the session participants at the conclusion of the session to place the portable device in the charging tray. Further, it would be desirable for an audio conferencing system to not only warn participants in an audio conferencing session, but to send a message to a remote audio conferencing management application/server indicating that one or more portable devices associated with a particular audio conferencing system were not returned to a charging tray. The server can, in turn, generate and send a message two one or more individuals with access to the conferencing system indicating that at least one portable device is not in its charging tray. These and other embodiments will now be described with references to the following figures.

Component parts of a wireless audio conferencing system 100 will now be described with reference to FIG. 1. The system 100 is comprised of a fixed part and a plurality of portable parts. The fixed part in this case is a base station 102 which is linked to a local or wide area network and which operates to support a plurality of the portable parts. The portable parts in this case include a plurality of wireless microphones 110, a wireless loud speaker 108, and a wireless control device 106, and each of the portable parts comprising the system 100 have a rechargeable battery. The system 100 also includes a portable part charging tray 104 showing receptacles into which the microphones, speaker and control device can be placed in order to charge batteries on the portable parts. Each receptacle and each portable part comprising the system 100 includes electrical contacts that when aligned cause current to flow to the rechargeable batteries. It should be understood, that although FIG. 1 only shows the system 100 as having a single loud speaker and a single control device, the system can comprise more than one of each of these portable parts.

Figure 2:
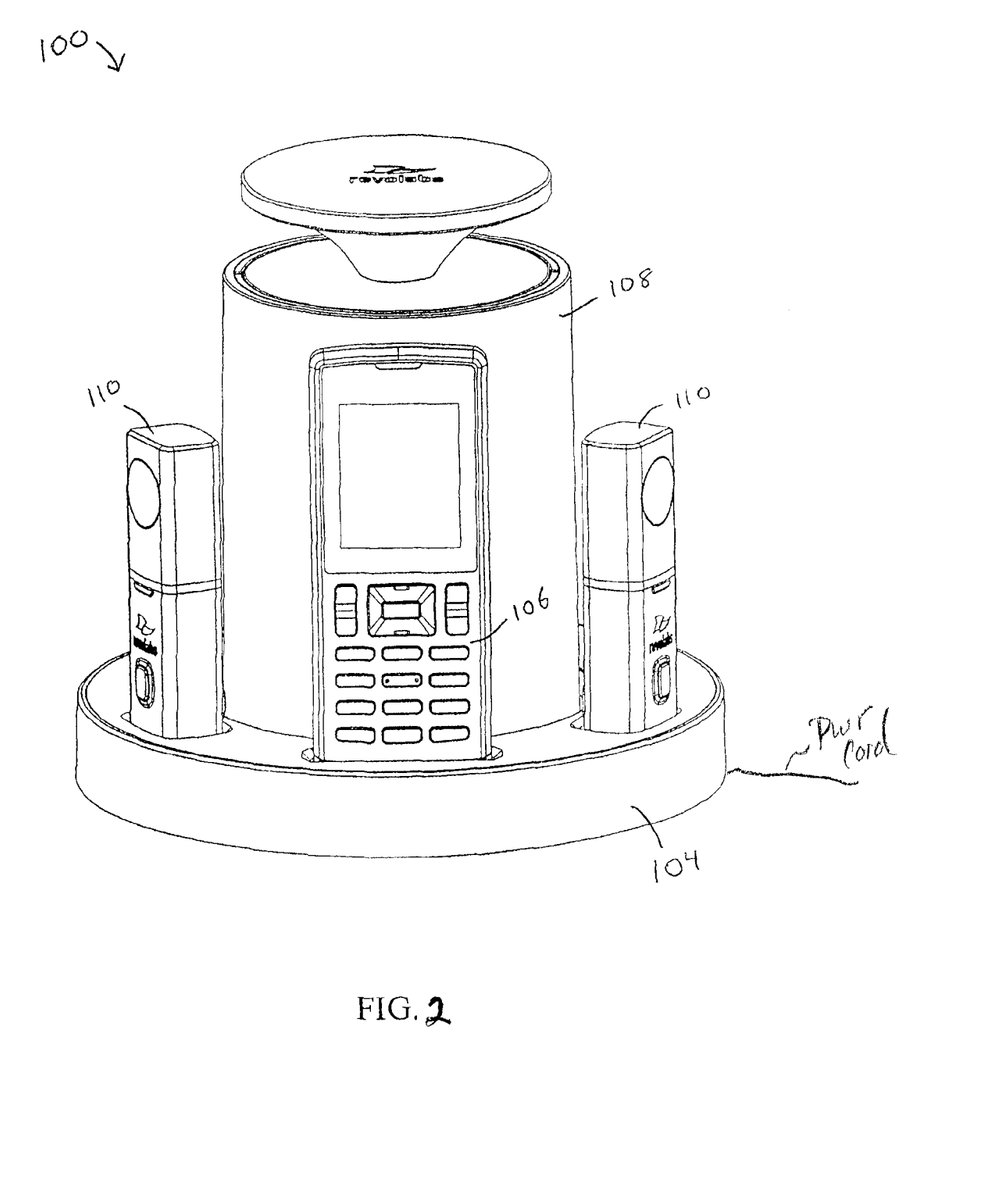
FIG. 2 is a diagram showing the components of the wireless audio conferencing system 100 positioned in the charging tray.

The component parts comprising the wireless audio conferencing system of FIG. 1 (with the exception of the base station 102) are shown in FIG. 2 placed in their appropriate charging tray receptacle. When the portable parts are in this position, the rechargeable battery in each device can be charged. The charging tray is typically positioned within a meeting room such that it is convenient for meeting participants to remove the portable parts from and replace them to the charging tray at the beginning and at the end of a communication session respectively. However, as discussed previously, it is not always the case that the meeting participants remember to place a portable part into the charging tray at the conclusion of an audio conferencing session (end of a call). Portable parts may not be returned to the charging tray for any one or a number of reasons. For instance, one or more participants can simple place a microphone down on the meeting table at the end of a call, with or without turning the microphone power off. A participant can walk out of the meeting room with a microphone at the end of a call with or without turning the microphone power off. Or, a participant can walk out of the meeting room prior to the end of a call and not subsequently return to place the microphone into the charging tray. In any one of these case, one or more microphones may not be placed into the charging tray at the end of a call, and so will not recharge in preparation for a next call, and it may be difficult for the participants in the next call to locate all of the portable parts they need in order to conduct the call.

Functional elements comprising a wireless audio conferencing system 300 are now described with reference to FIG. 3. The audio conferencing system 300 is substantially the same as the system 100 described earlier with reference to FIGS. 1 and 2, and in this regard the audio conferencing system 300 has a fixed part and a plurality of portable parts. The fixed part in this case is a base station 310 which is connected to a local network such as an Ethernet, or which is connected to a wide area network such as the Internet. The base station 310 generally operates to support a number of portable parts, which in this case comprise a plurality of wireless microphones, MIC.0-MIC.n, one or more wireless control devices 315, and one or more wireless loud speakers 320. The base station has a digital radio 311 which generally operates to receive audio information from a far end (F.E.) audio system and to place this audio information into a packet format for transmission over the air to the loud speaker 320. The base station also runs acoustic echo cancellation functionality 312 that operates to remove acoustic echo in a local audio signal that it receives from any of the microphones before sending the echo removed audio signal to a F.E. audio system.

Figure 3:
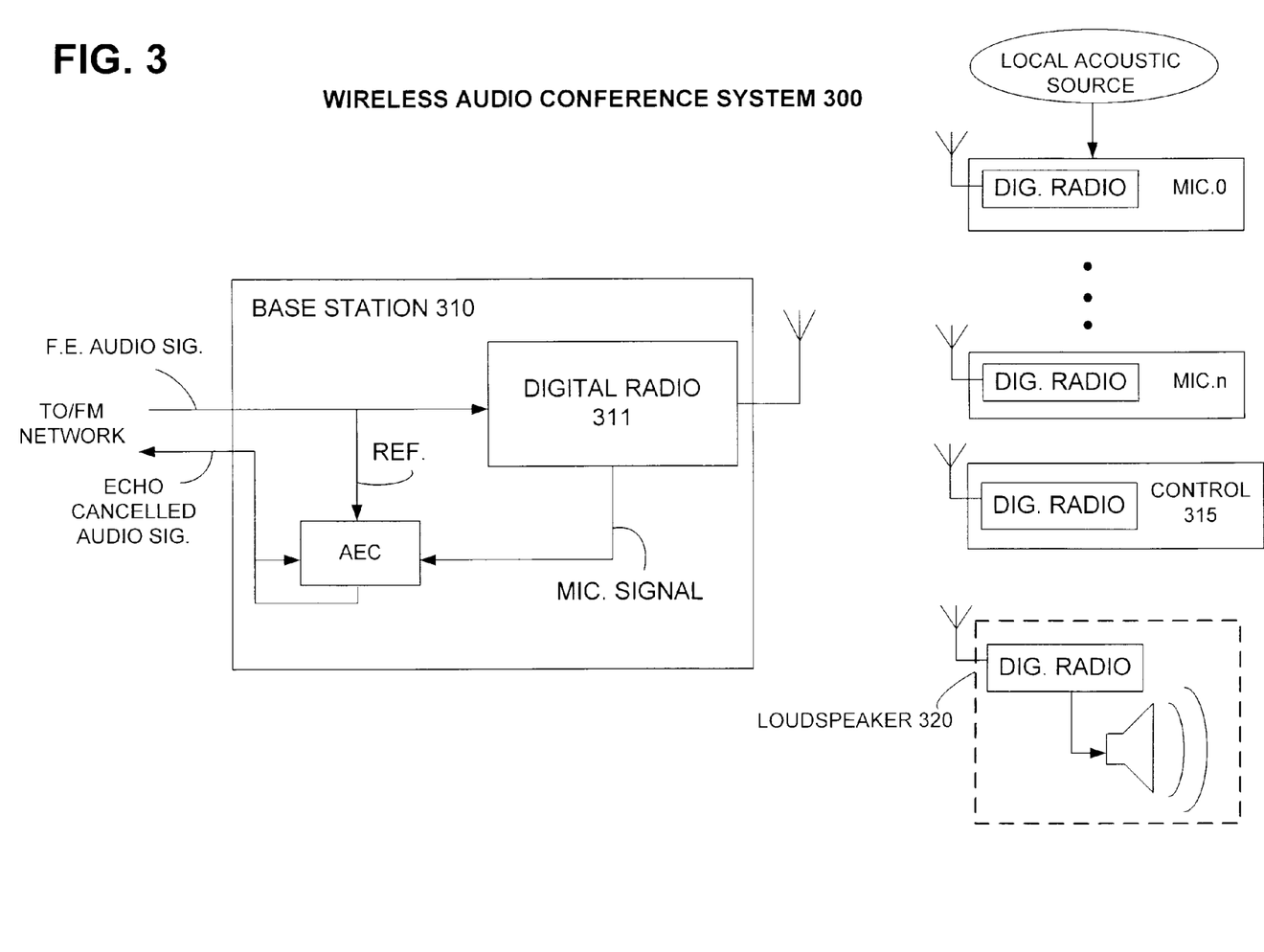
FIG. 3 is a diagram showing functional element comprising a wireless audio conferencing system 300.

Continuing to refer to FIG. 3, the digital radio 311 also operates to receive requests from each of the portable parts for one or more available communication channels, and to assign available channels to each of the portable parts according to the request. In one embodiment of the invention, the DECT 6.0 communications technology is implemented in the digital radio 311, and this technology supports up to one hundred twenty duplex channels in Europe and sixty duplex channels in the United States. In addition to managing the assignment of communication channels to the portable parts, the digital radio 311, or associated base station 310 functionality, monitors the operational state characteristics of itself and of each portable part currently in communication with the system 300 to determine, among other things, whether the portable part has been placed in a charging tray at the end of a call. In one embodiment, the operational state characteristics which the base station 310 is designed to monitor can include, but is not limited to, whether the base station is currently supporting an active communication session or not, whether a portable part is linked to the base station or not, whether a portable part is in or out of range or not, whether a portable part battery charge is low or not, and whether a portable part is turned off or not. The operation of the base station to monitor the operational state characteristics of itself and of each portable part, and to use these operational state characteristics to determine whether the portable part is returned to the charging tray at the end of a call is described later with reference to FIG. 4.

Each of the portable parts (wireless microphones, Mic.0-Mic.n, wireless controls 315 and wireless loud speakers 320) shown in FIG. 3 have a digital radio module that operates in a manner similar to the digital radio in the base station 310. Generally, the digital radios in the microphones operate to transmit local audio information, received and sampled by each microphone, to the base station. The control module 315 operates to control the initialization and termination of a communication session supported by the wireless audio conferencing system 300, and it operates to perform other functionality that will not be detailed herein. The wireless loud speaker 320 generally operates to receive and play a F.E. audio signal. The digital radios comprising each of the portable parts also operate to receive beacons and other signals that are broadcast by the base station, and they operate to transmit messages to the base station that comprise information indicative of an operational state characteristic of the portable part. Each of the digital radios comprising the fixed and portable parts described with relation to the wireless audio conferencing system 300 can be implemented in a specially designed digital signal processor device.

Figure 4:
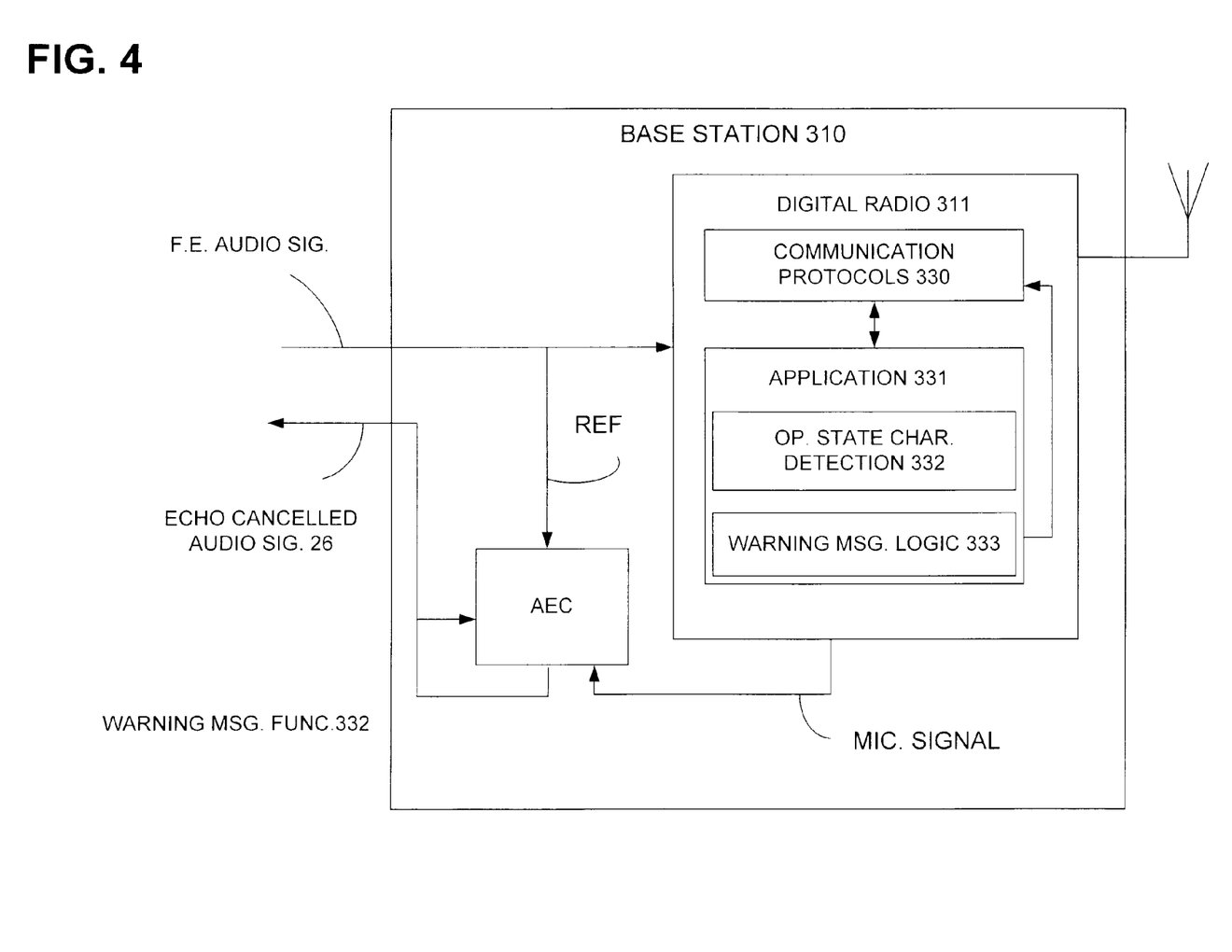
FIG. 4 is a diagram showing the functional element comprising a base station 310.

Turning now to a description of FIG. 4. The digital radios comprising the base station 310 and each of the portable parts includes a standard set of four, layered, network communication protocols 330. At the lowest layer (layer 1) of the protocol stack, the set of protocols comprises a physical layer, followed by a medium access control (MAC) layer, followed by a link layer and finally an upper most network layer. Other communication protocols, such as an interworking layer and an application layer, can be included above the network communication protocols. Generally, the network communication protocols manage the initiation and termination of a communications link between a fixed and a portable part, they manage access to the wireless medium, and they format information (both audio and messaging) for transmission over the wireless medium between the fixed and portable parts. In addition to the network communication protocols, the application protocol or protocols operate to receive information generated by functionality running on the base station and on each of the portable parts, and to convert this information into messages suitable for use by the network protocols. The purpose and operation of the portable part functions is described later with reference to FIG. 6, FIG. 7A and FIG. 7B. The design and operation of each of the layered, network communication protocols is well known and so will not be described further.

With continued reference to FIG. 4, the digital radio 311 also includes a fixed/portable part operational state characteristic detection and processing application 331. This application can be implemented in firmware and stored in non-volatile memory associated with a DSP in which the digital radio is implemented. Application 331 generally operates to receive and process current operational state characteristic information in messages transmitted by the portable parts. These messages comprising information such as whether a portable part is powered on or not and the charge state of its battery. The application 331 also operates to detect and process information corresponding to the operational state characteristics of the digital radio 311 to include, but not limited to, whether the radio is currently supporting a communication session with another, remote audio conferencing system, and whether or not the radio is linked to a portable part, which channels are assigned to the portable part and the identity of the portable part. An operational state characteristic detection function 332 comprising the application 331 operates to receive the portable part operational state characteristic information and to detect the radio 311 operational characteristic information, and the function 332 performs any processing of this information that is necessary to place it into a form that can be used by a warning message logic function 333. The operation of the application 331 is described in more detail later with reference to FIG. 5. The fixed and portable part operational state characteristic information received, detected and processed by the application 311 is utilized by the warning message logic 333 to determine what type of warning message to transmit, and to generate the warning messages for transmission over the local wireless network to a portable part, or over a wide area network to a central, audio conferencing management/admin process running on a server connected to the network. This warning message can include information indicating that one or more portable parts should be returned to a charging tray. The warning message can be sent to and played by a wireless loud speaker associated with the conferencing system, and the message can include a prerecorded or synthesized verbal indication that one or more portable parts should be located and returned to the charging tray. In conjunction with or separate from the warning message sent to the wireless loud speaker, a the warning message can be sent to and played by a wireless microphone that includes audible signal information, such as a tone or a beep, indicative of the location of the microphone.

Figure 5:
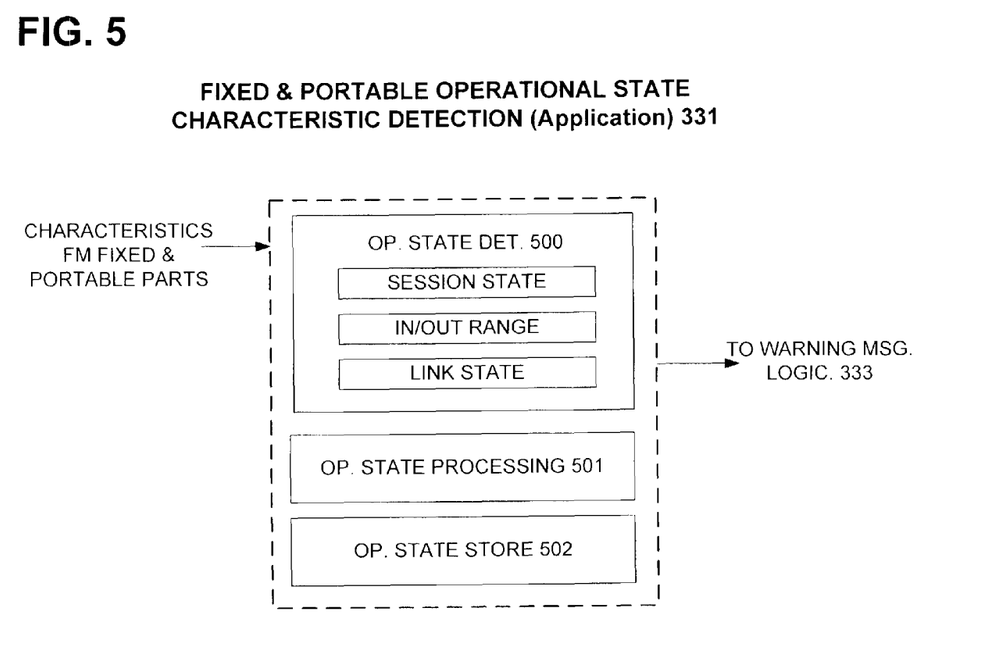
FIG. 5 is a diagram showing the functional elements comprising an operational state characteristic detection module 331.

Turning now to FIG. 5, the fixed and portable part operational state characteristic detection and processing application 331 is comprised of an operational state characteristic detection function 500, a processing function 501, and a store of current detected operational state characteristics 502. The detection function 500 generally operates to detect the operational state characteristics of both the fixed and portable parts comprising the wireless audio conferencing system 300, which characteristics in this case can be the session state (active/inactive), whether a portable part is in or out of range, he link state between the base station and a portable part, whether a portable part is turned on or off, and the battery charge state (low charge/charged) of a portable part battery. The operational state characteristics are then operated on by the processing function 501 which can index them according to the identity of a portable part with which the characteristic is associated. So for instance, if the radio sets up a communication link with Mic.1, the link state detection function comprising the detector 500 determines that a link has been established, with which portable part the link is established and the identity of the channels that are assigned to the portable part. All of this information can be processed by 501 for storage in 502.

Continuing to refer to FIG. 5, if the Mic.1 sends a message to the base station that includes an operational state characteristic, such as whether the microphone was manually tuned off or the charge state of its battery, the operational state processing function 501 receives this characteristic information and processes it for storage in the store 502 as described above. All of the operational state characteristic information in store 502 is accessible and used by the logic to generate warning messages. The process followed by this logic to determine what type of warning message to generate is described later with reference to FIG. 8 and FIG. 9.

Figure 6:
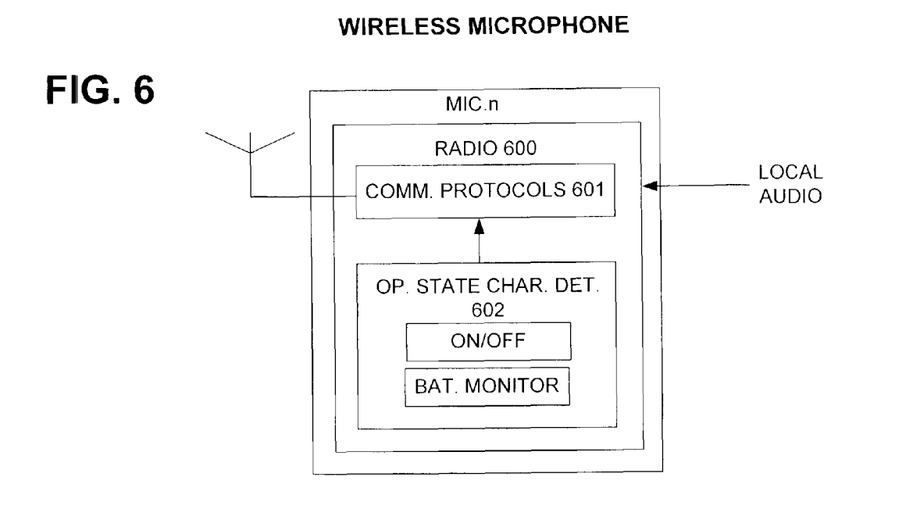
FIG. 6 is a diagram of certain operational functionality comprising a wireless microphone.

As described earlier, each portable part has a digital radio very similar in operation to the digital radio 311 in the base station 300, with the exception that each of the radios in a portable part supports an application that operates to detect the operational state characteristics of the portable part in which it is implemented. These operational state characteristics can include, but are not limited to, whether the portable part is powered on or not and the charge state of its battery (low battery charge). FIG. 6 shows a microphone, Mic.n, comprised of a set of network communication protocols 601, similar to the set of layered, network communication protocols 330 described earlier with reference to FIG. 4, and an application 602 that operates to detect the operational state characteristics of the microphone as described above. The application 602 is comprises of a power on/off detection function, and a battery level detection function. Each of these functions operates to detect wireless microphone operational characteristics generated by the microphone. So, for instance, if the microphone is turned off manually by a user, it will send a message to the base station that it was turned off manually, as opposed to being turned off automatically due to a low battery condition. Not shown in the microphone of FIG. 6 is an acoustic transducer element that operates to receive acoustic audio signals and convert them into an audio signal suitable for sampling.

Figure 7A:
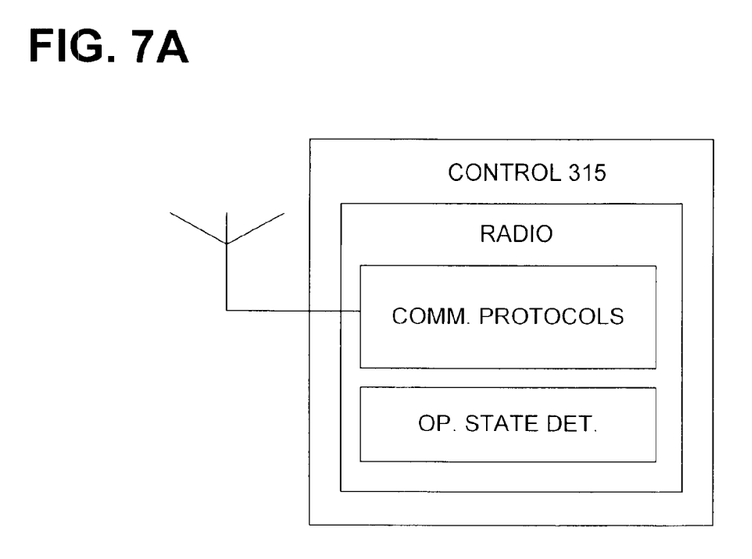
FIG. 7A is a diagram of certain operational functionality comprising a wireless control device 315.
Figure 7B:
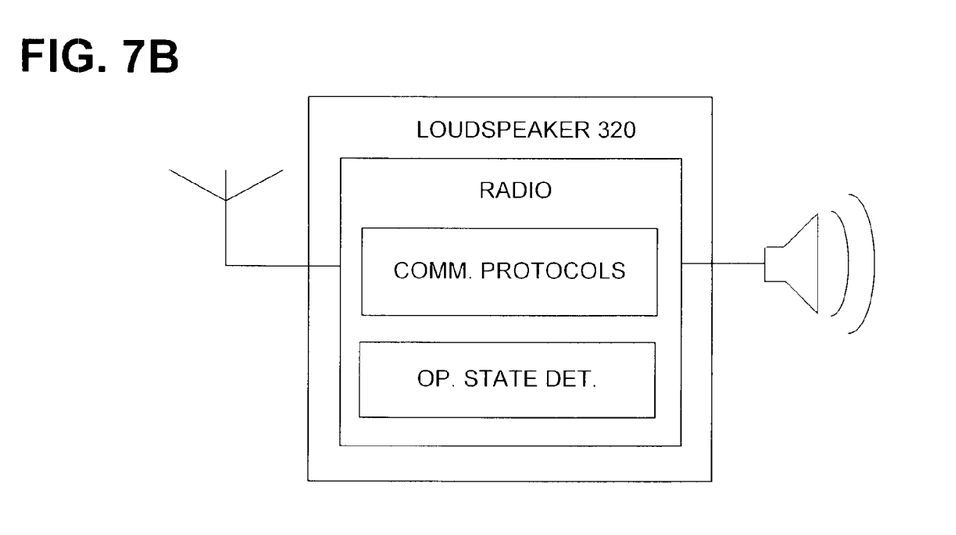
FIG. 7B is a diagram of certain operational functionality comprising a wireless loudspeaker 320.

FIG. 7A is a diagram showing the functional elements comprising the control device 315 described earlier with reference to FIGS. 2 and 3. The functional elements comprising the control device 315 are substantially the same and operate in a similar manner to those comprising a wireless microphone and so will not be described here further. FIG. 7b is a diagram showing the functional elements comprising the wireless loudspeaker 320 described with reference to FIGS. 2 and 3. The functional elements comprising the wireless loudspeaker are substantially the same and operate in a similar manner to those comprising any one of the wireless microphones, with the exception that the loudspeaker has a acoustic sound transducer element that operates to play audio signal sent to the wireless loudspeaker from the base station.

Different types of portable parts (microphone, loud speaker, control) associated with the wireless audio conferencing system 300 can be configured to operate differently depending upon whether or not they are being charged (currently in or not in a charging tray). For instance, a wireless loud speaker can be configured to establish a communication link with the base station when it is connected to a charging tray and when it is not connected to the charging tray. Whereas, a wireless microphone and a control device are configured to only be linked to the base station when they are not connected to the charge tray. This difference in portable part configuration is in large part due to the manner in which each part is used by participants to an audio conference.

Typically, the loud speaker is placed centrally on a conference table during an audio conference session, and as it is convenient to also position the charging tray in the same position, the loud speaker is configured to link to the base station while connected to the charging tray. On the other hand, wireless microphone and a control device are meant to move around a conference room with the participants, and would be of little use connected to a charging tray located in a central conference table location. With the above description as context, the process that the wireless audio conferencing system 300 can follow to generate and transmit a warning message indicating that one or more portable parts are not connected to a charging tray is shown and described with reference to FIG. 8.

Figure 8:
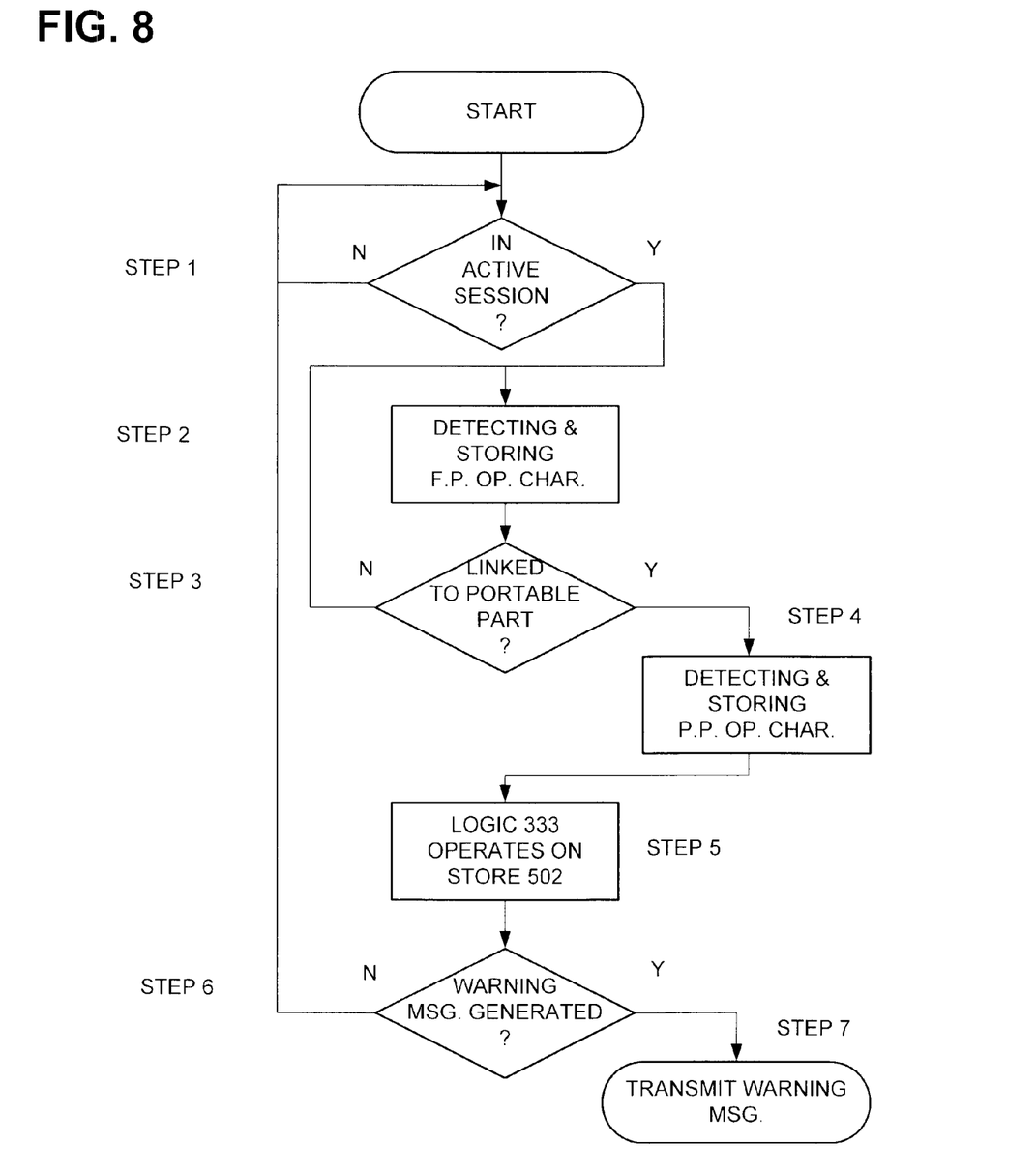
FIG. 8 is a logical flow diagram of an embodiment of the invention.

In Step 1 of FIG. 8, the wireless audio conferencing system 300 is controlled to initiate an audio conferencing session with a remote audio system. More specifically, the control device 315 (once removed and linked to the base station) can be employed to control the base station 310 to initiate a call by dialing a number associated with another, remote communication device. Once the base station has completed the call set up process, then in Step 2 the application 331 running in association with the radio 311 in the base station 310 starts to monitor the operational state characteristics of certain system 300 functionality. At this time, the application 331 can monitor and store information (characteristics) associated with the state of the communication session being conducted with the remote system. In Step 3, the base station determines whether one or more portable parts have established a communications link with it, and if so, the process proceeds to Step 4, otherwise the process returns to Step 2. After the base station has established a communication link with at least one portable part (P.P.), in Step 4 the application 331 operates to detect, process and store operational state characteristic information associated with both the base station (F.P.) and any portable parts (P.P.) that are currently linked to it. Then, in Step 5, the logic 333 uses the stored operational state characteristics to determine whether or not to generate a warning message, and if the logic 333 determines that a warning message should be sent, then in Step 6 an appropriate warning message is generated, and in Step 7 the warning message is sent to the appropriate device, network address or personal communications device. An appropriate device can be the wireless loud speaker associated with the base station, it can be one or more of the wireless microphones, it can be a system management/administrative application running on a server remote to the wireless audio conferencing system 300, or it can be a personal communication device such as a smart phone, tablet computer or other personal device connected over a communication network with the system 300. Returning to Step 6, in the event that it is determined that a warning message need not be sent, then the process returns to Step 1.

Figure 9:
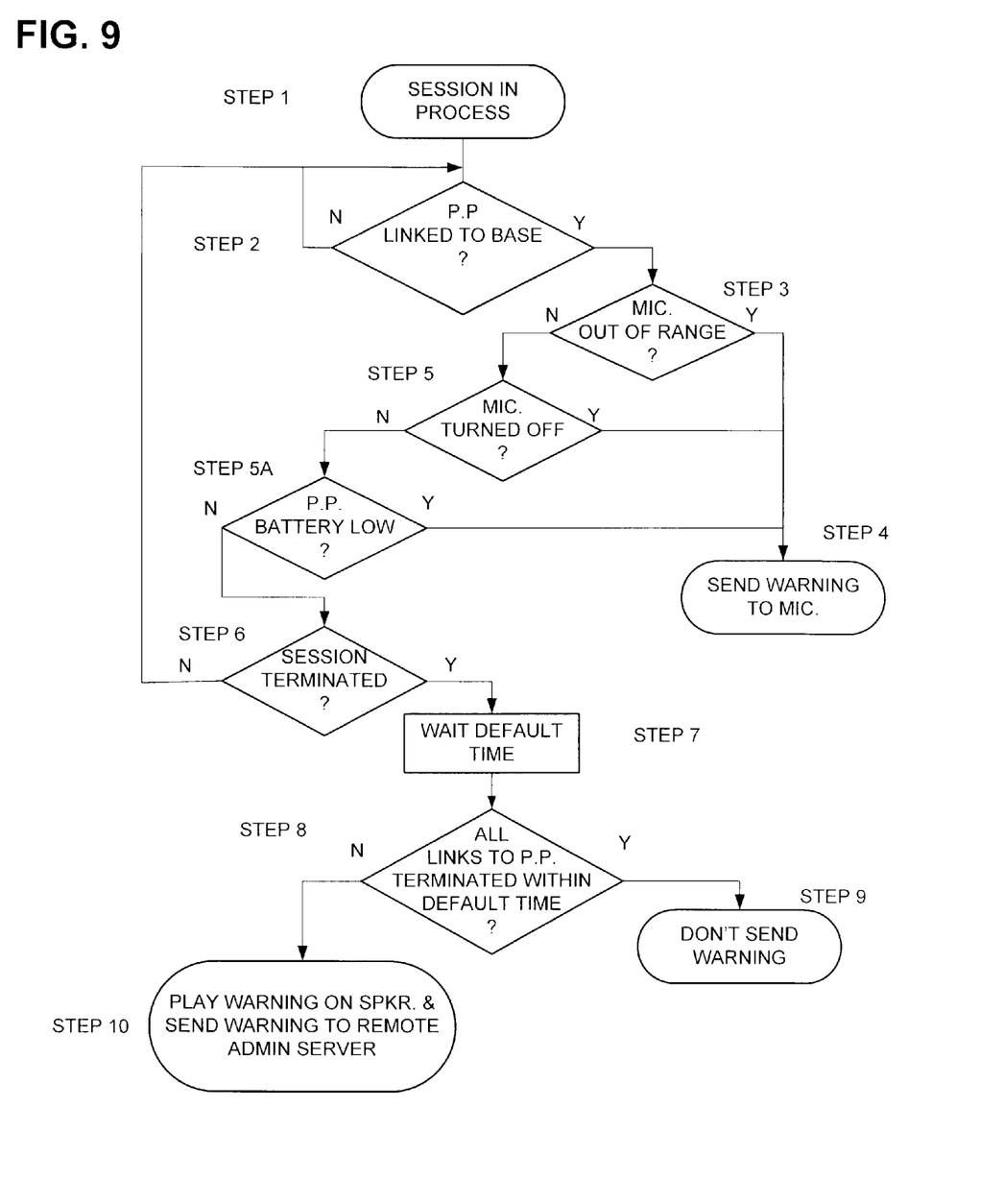
FIG. 9 is a logical flow diagram of the embodiment of FIG. 8 in more detail.

FIG. 9 is a logical flow diagram illustrating in more detail the operation of Steps 5 and 6 in FIG. 8. Assuming that in Step 1 a communication session (call) is already in progress, the base station 310 in Step 2 determines whether one or more portable parts are currently linked with it, and if so the process proceeds to Step 3. Otherwise the process returns loops on Step 2. In Step 3, the base station (application 331) determines whether a portable part (microphone in this case) is moving out of range or not, and if so then the process proceeds to Step 4 and the logic 333 determines that a warning message is sent to the microphone. This warning message can include instructions that when received by a microphone can result in a visual or audio warning being played by the microphone that is indicative that the microphone is moving out of range, or a request to return the microphone to a charging tray. On the other hand, if in Step 3 the microphone is in range of the base station the process proceeds to Step 5 where the base station (application 331) determines whether the microphone is turned on or turned off (still linked or not linked to the base station). If the microphone is turned off, then the process proceeds to Step 4 and a warning message can be sent to either an individual or to a remote system management application. If, in Step 5, the microphone is not turned off, then the process proceeds to Step 5A where the application 331 determines whether a portable part (microphone, control, and/or loud speaker) to which the base station is linked has sent a low battery charge indication, and it so, then the application generates a warning message.

Continuing to refer to FIG. 9, in Step 6, the base station application 311 determines whether or not the communication session is terminated, and if the session is still active, the process returns to Step 2, otherwise the process proceeds to Step 7 and the base station application 311 waits a predetermined default period of time before proceeding to Step 8. In Step 8, the application 331 determines that all of the links with the portable parts are terminated or not terminated within the default time, and if all of the links are terminated, then the process proceeds to Step 9 and the logic 333 determines that no warning message should be sent. However, if in Step 8 it is determined that one or more links did not terminate within the default time, then the process proceeds to Step 10 and the logic 331 determines that a warning message should be sent to and played by a loud speaker associated with the system and/or a warning message should be sent to a remote admin server that one or more microphones may not have been returned to the charging at the end of the session.

The base station 310 described above with reference to FIG. 9 operates to detect when a communication link is established with a portable part, and detects the identity and certain operational state characteristics of the portable part without tracking the number of active portable part links it is supporting. Consequently, at the end of a communication session, the base station can only determine that one or more portable parts are not returned to the charging tray. In an alternative embodiment, the operation of the application 331 running in association with the digital radio 311 comprising the base station 310, can be extended to maintain a current count of the number of communication links with portable parts it is supporting. At the end of a session, the logic 333 can compare the number of links that are terminated to the number of links that were active during the session, and determine that not all of the portable parts have been returned to the charging tray. Such a determination causes a warning message to either be played on a loud speaker association with the conferencing system or to be sent to a remote admin server.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. In a wireless audio conferencing system connected to an external network, a method of generating a warning message, comprising: detecting and recording by a base station, associated with the wireless audio conferencing system, one or more operational state characteristics associated with a first one of a plurality of portable parts linked to it during a communication session, the communication session being established between the base station and a remote audio conferencing system, and the plurality of portable parts being comprised of at least one wireless loudspeaker and at least two or more wireless microphones all of which are wirelessly linked to the base station during the communication session; terminating the communication session, and the base station using the recorded one or more operational state characteristics associated with the first one portable part to determine that it is not returned to a charging tray for charging; and generating and sending to an audio conferencing administrative process running on a server connected to the external network or to another one of the other plurality of the portable parts linked to the base station a warning message indicating that the first one of the plurality of the portable parts is not returned to the charging tray for charging at the termination of the communication session; wherein the server connected to the external network is not associated with the wireless audio conferencing system, and the operational state characteristics associated with the first one of the plurality of the portable parts is any one or more of an indication that the first one of the plurality of the portable parts is within range or is not within range of the base station, is turned on, is turned off, the battery is charged, the battery charge is low, and if a number of active portable part session links does not match a number of terminated portable part session links at the termination of the communication session.

2. The method of claim 1, wherein the detected operational state characteristic is one of an indication that the first one of the plurality of the portable part is within range or is not within range of the base station, is turned on, is turned off, the battery is charged, and the battery charge is low.

3. The method of claim 1, wherein the base station comprises a digital radio having computer program instructions that when operated on by a digital signal processing device causes the base station to detect and to record the operational state characteristics of the plurality of portable parts linked to it during the communication session.

4. The method of claim 1, wherein the record of the operational state characteristic associated with the first one of the plurality of the portable parts is uniquely identified by the identity of the first one of the plurality of the portable parts.

5. The method of claim 1, wherein the plurality of portable parts comprises one or more of a wireless microphone, a wireless loud speaker and a wireless control device.

6. The method of claim 1, wherein the warning message is sent to one or more of the wireless loudspeakers, the wireless microphones, a remote administrative server, and a communication device under the control of a meeting participant.

7. The method of claim 1, further comprising the base station waiting a selected period of time after the communication session is terminated for each one of the plurality of the portable part to be returned to the charging tray before sending the warning message.

8. The method of claim 1, wherein the base station determines that any one or more of the plurality of the portable parts is not returned to the charging tray at the termination of the communication session if a number of active portable part session links does not match a number of terminated portable part session links.

9. A wireless audio conferencing system connected to an external network, comprising: a base station and a plurality of portable parts, the base station having a digital radio device operating to support a wireless communication link with each one of the plurality of the portable parts and to initiate an audio conferencing session, and having computer program instructions for execution by the base station that causes it to detect and record one or more of an operational state characteristic associated with at least a first one of the plurality of the portable parts linked to it during a communication session, the communication session being established between the base station and a remote audio conferencing system, and when the communication session is terminated, the base station uses the recorded one or more operational state characteristics associated with the at least first one portable part to determine that the first one portable part is not returned to a charging tray for charging, and generating and sending to an audio conferencing administrative process running on a server connected to the external network or to another one of the other portable parts linked to the base station a warning message indicating that the first one portable part is not returned to the charging tray for charging at the termination of the communication session; wherein the server connected to the external network is not associated with the wireless audio conferencing system, the plurality of the portable parts are comprised of at least one loudspeaker and at least two or more wireless microphones all of which are wirelessly linked to the base station during the communication session, and the operational state characteristics associated with the first one of the plurality of the portable parts is any one or more of an indication that the first one of the plurality of the portable parts is within range or is not within range of the base station, is turned on, is turned off, the battery is charged, the battery charge is low, and if a number of active portable part session links does not match a number of terminated portable part session links at the termination of the communication session.

10. The wireless audio system of claim 9, wherein the one or more detected operational state characteristics is an indication that the portable part is within range of the base station, the portable part is out of range of the base station, the portable part is turned on, the portable part is turned off automatically, the portable part is turned off manually, the portable part battery is charged, and the portable part battery charge is low.

11. The wireless audio conferencing system of claim 9, wherein the operational state characteristics associated with each of the plurality of the portable parts is stored in a record that is uniquely identified by the identity of each of the portable part.

12. The wireless audio conferencing system of claim 9, wherein the plurality of the portable parts comprises one or more of a wireless microphone, a wireless loud speaker and a wireless control device.

13. The wireless audio conferencing system of claim 9, wherein the warning message is sent to one or more of the wireless loudspeakers, the wireless microphones, a remote administrative server, and a communication device under the control of a meeting participant.

14. The wireless audio conferencing system of claim 9, further comprising the base station waiting a selected period of time after the communication session is terminated for the portable part to be returned to the charging tray before sending the warning message.

15. The wireless audio conferencing system of claim 9, wherein the base station determines that the portable part is not returned to the charging tray at the termination of the communication session after an examination of the record of the operational characteristics associated with the portable part indicates that the communication link between it and the portable part is still active.

16. In a wireless audio conferencing system connected to an external network, a method of generating a warning message, comprising: a base station associated with the wireless audio conferencing system detecting and recording that a first one of a plurality of portable parts linked to it during a communication session is moving out of range, is turned off, has a low battery condition, or that a number of active portable part session links does not match a number of terminated portable part session links at the termination of the communication session; the base station using the recording to determine that the communication session is not terminated; and generating and sending a warning message to an audio conference administrative process running on a server connected to the external network or sending the warning message to another one of the other plurality of the portable parts linked to the base station indicating that the first one portable part is to be returned to the charging tray for charging; wherein the server connected to the external network is not associated with the wireless audio conferencing system, and the plurality of the portable parts is comprised of at least one wireless loudspeaker and two or more wireless microphones all of which are wirelessly linked to the base station during the communication session, the communication session being established between the base station and a remote audio conferencing system.

17. The method of claim 16, wherein the portable part is a wireless microphone.

\* \* \* \* \*